(12) United States Patent
Ledwith et al.

(10) Patent No.: US 11,014,512 B2
(45) Date of Patent: May 25, 2021

(54) VEHICLE HAVING GROMMET ASSEMBLY

(71) Applicants: Brandon V Ledwith, Lasalle (CA); Alexander Cleland, Commerce, MI (US); Michael D Eason, Detroit, MI (US)

(72) Inventors: Brandon V Ledwith, Lasalle (CA); Alexander Cleland, Commerce, MI (US); Michael D Eason, Detroit, MI (US)

(73) Assignee: FCA US LLC, Auburn Hills, MI (US)

( * ) Notice: Subject to any disclaimer, the term of this patent is extended or adjusted under 35 U.S.C. 154(b) by 92 days.

(21) Appl. No.: 16/574,928

(22) Filed: Sep. 18, 2019

(65) Prior Publication Data

US 2021/0078511 A1   Mar. 18, 2021

(51) Int. Cl.
*B60R 16/00* (2006.01)
*B60R 16/02* (2006.01)
*B60J 5/10* (2006.01)

(52) U.S. Cl.
CPC ............ *B60R 16/0222* (2013.01); *B60J 5/10* (2013.01)

(58) Field of Classification Search
CPC .............................. B60R 16/0222; B60J 5/10
See application file for complete search history.

(56) References Cited

U.S. PATENT DOCUMENTS

| | | | |
|---|---|---|---|
| 8,420,943 B1 * | 4/2013 | La | B60R 16/0222 174/152 G |
| 8,740,279 B1 | 6/2014 | McGoff et al. | |
| 2007/0181332 A1 * | 8/2007 | Fraley | B60R 16/0222 174/72 A |
| 2017/0106817 A1 * | 4/2017 | Suzuki | H02G 3/0468 |

* cited by examiner

*Primary Examiner* — Pete T Lee
(74) *Attorney, Agent, or Firm* — Ralph E Smith

(57) ABSTRACT

A vehicle includes a vehicle body, a door coupled to the vehicle body and a flexible vehicle-body grommet. The door is pivotable about a horizontal axis between a closed position and a horizontal open position, and about a vertical axis between the closed position and a vertical open position. The flexible vehicle-body grommet is coupled to the vehicle body and the door. The flexible vehicle-body grommet is pivotable about the horizontal axis when the door is pivoted to the horizontal open position.

13 Claims, 9 Drawing Sheets

VEHICLE HAVING GROMMET ASSEMBLY

FIELD

The present disclosure relates to a vehicle having a grommet assembly.

BACKGROUND

This section provides background information related to the present disclosure and is not necessarily prior art.

A pickup truck disclosed in U.S. Pat. No. 8,740,279, which issued Jun. 3, 2014 and is incorporated herein by reference in its entirety, includes a multi-functional tailgate spanning a width of the aft end of the cargo bed. The multi-functional tailgate is pivotably coupled to the cargo bed so that the multi-functional tailgate is allowed to pivot about a horizontal axis between a horizontal open position and a closed position. The multi-functional tailgate also includes two doors that can be latched together so as to pivot together between the horizontal open position and the closed position, or unlatched so as to pivot independently of each other between the horizontal open position and the closed position.

When the two doors are unlatched from each other, each door can rotate independently about the horizontal axis (i.e., between the horizontal open position and the closed position) and about a vertical axis (i.e., between a vertical open position and the closed position). The teachings of the present disclosure provide a grommet assembly that allows a wiring harness in one or both of the doors to move in multiple directions, thereby avoiding damage to the wiring harness.

SUMMARY

This section provides a general summary of the disclosure, and is not a comprehensive disclosure of its full scope or all of its features.

In one form, the present disclosure provides a vehicle that includes a vehicle body, a door and a flexible vehicle-body grommet. The door is coupled to the vehicle body and pivotable about a horizontal axis between a closed position and a horizontal open position. The door is also pivotable about a vertical axis between the closed position and a vertical open position. The flexible vehicle-body grommet is coupled to the vehicle body and the door. The flexible vehicle-body grommet is pivotable about the horizontal axis when the door is pivoted to the horizontal open position.

In some configurations of the vehicle of the above paragraph, the vehicle-body grommet stretches when the door is pivoted to the vertical open position.

In some configurations of the vehicle of any one or more of the above paragraphs, the vehicle-body grommet is unstretched when the door is pivoted to the horizontal open position.

In some configurations of the vehicle of any one or more of the above paragraphs, a vehicle frame attached to the vehicle body. The vehicle-body grommet is coupled the vehicle frame.

In some configurations of the vehicle of any one or more of the above paragraphs, a flexible door grommet attached to and disposed within the door.

In some configurations of the vehicle of any one or more of the above paragraphs, the vehicle-body grommet stretches and the door grommet at least partially compresses when the door is pivoted to the vertical open position.

In some configurations of the vehicle of any one or more of the above paragraphs, the vehicle-body grommet and the door grommet are made of a resiliently compressible material.

In some configurations of the vehicle of any one or more of the above paragraphs, the vehicle-body grommet extends vertically and the door grommet extends horizontally when the door is in the closed position.

In some configurations of the vehicle of any one or more of the above paragraphs, a wiring harness extending through the vehicle-body grommet and the door grommet. The wiring harness is attached to the vehicle-body grommet and the door grommet and causes the door grommet to at least partially compress when the vehicle-body grommet stretches.

In some configurations of the vehicle of any one or more of the above paragraphs, the vehicle-body grommet and the door grommet have a bellows construction.

In some configurations of the vehicle of any one or more of the above paragraphs, a grommet retainer attached to a lateral side of the door. The vehicle-body grommet and the door grommet are attached to the grommet retainer.

In some configurations of the vehicle of any one or more of the above paragraphs, the grommet retainer is made of a polymeric material.

In some configurations of the vehicle of any one or more of the above paragraphs, the vehicle-body grommet is made of a resiliently compressible material.

In some configurations of the vehicle of any one or more of the above paragraphs, the vehicle body is a cargo bed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
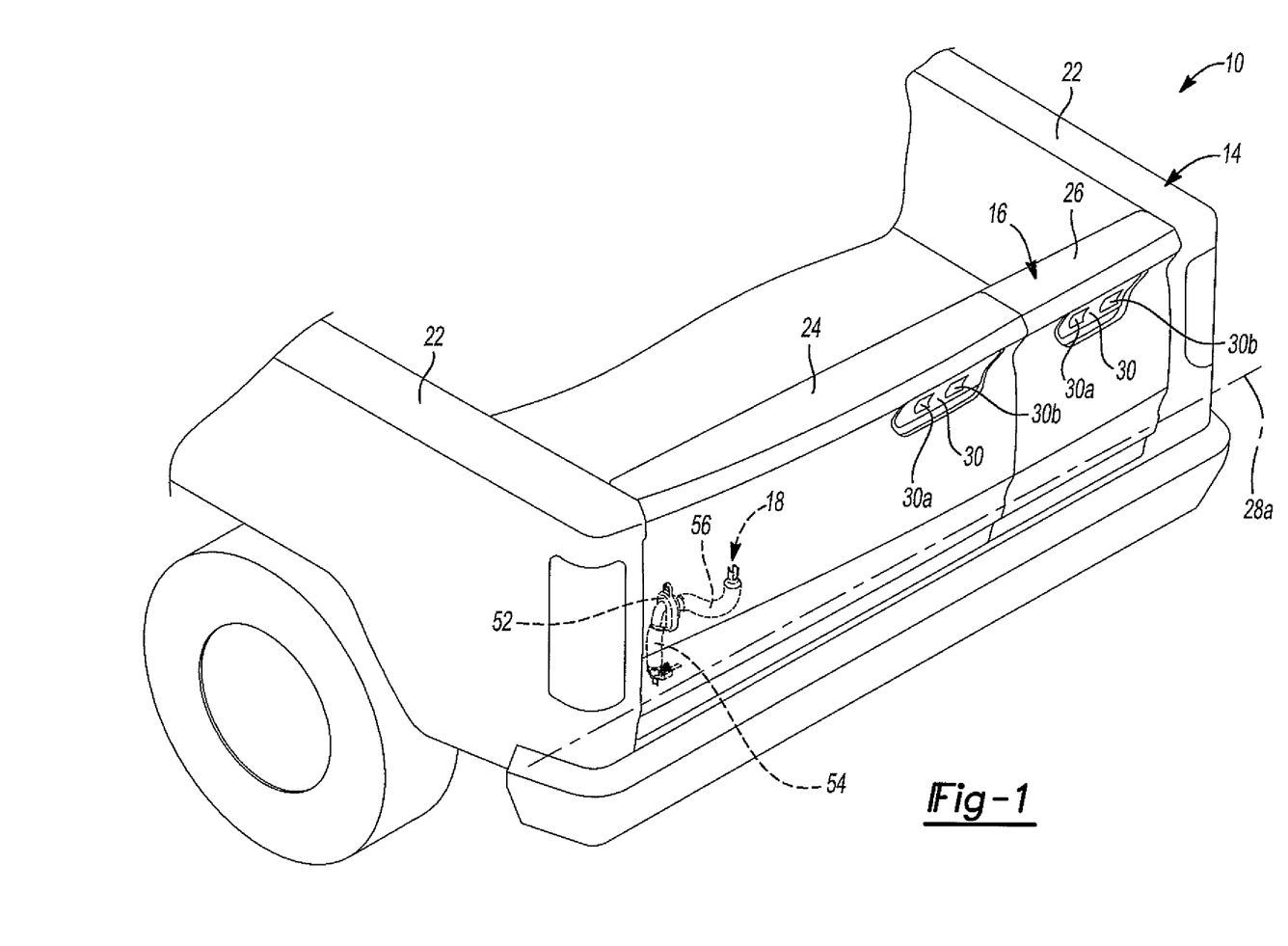
FIG. 1 is a partial perspective view of a vehicle having a grommet assembly, a cargo bed and a multi-functional tailgate according to the principles of the present disclosure.
Figure 2:
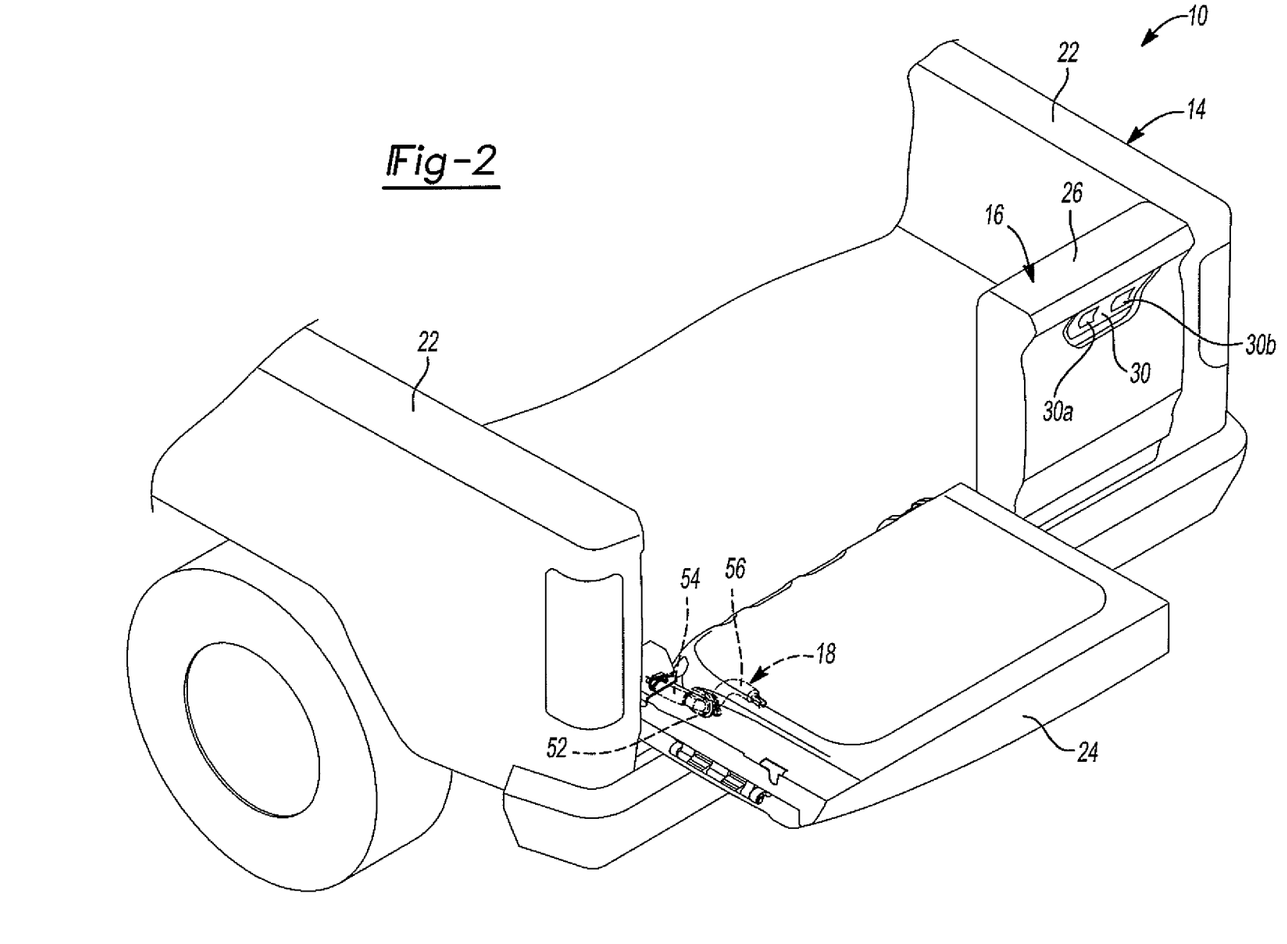
FIG. 2 is a partial perspective view of the cargo bed of FIG. 1 with one door of the multi-functional tailgate in a horizontal open position.
Figure 3:
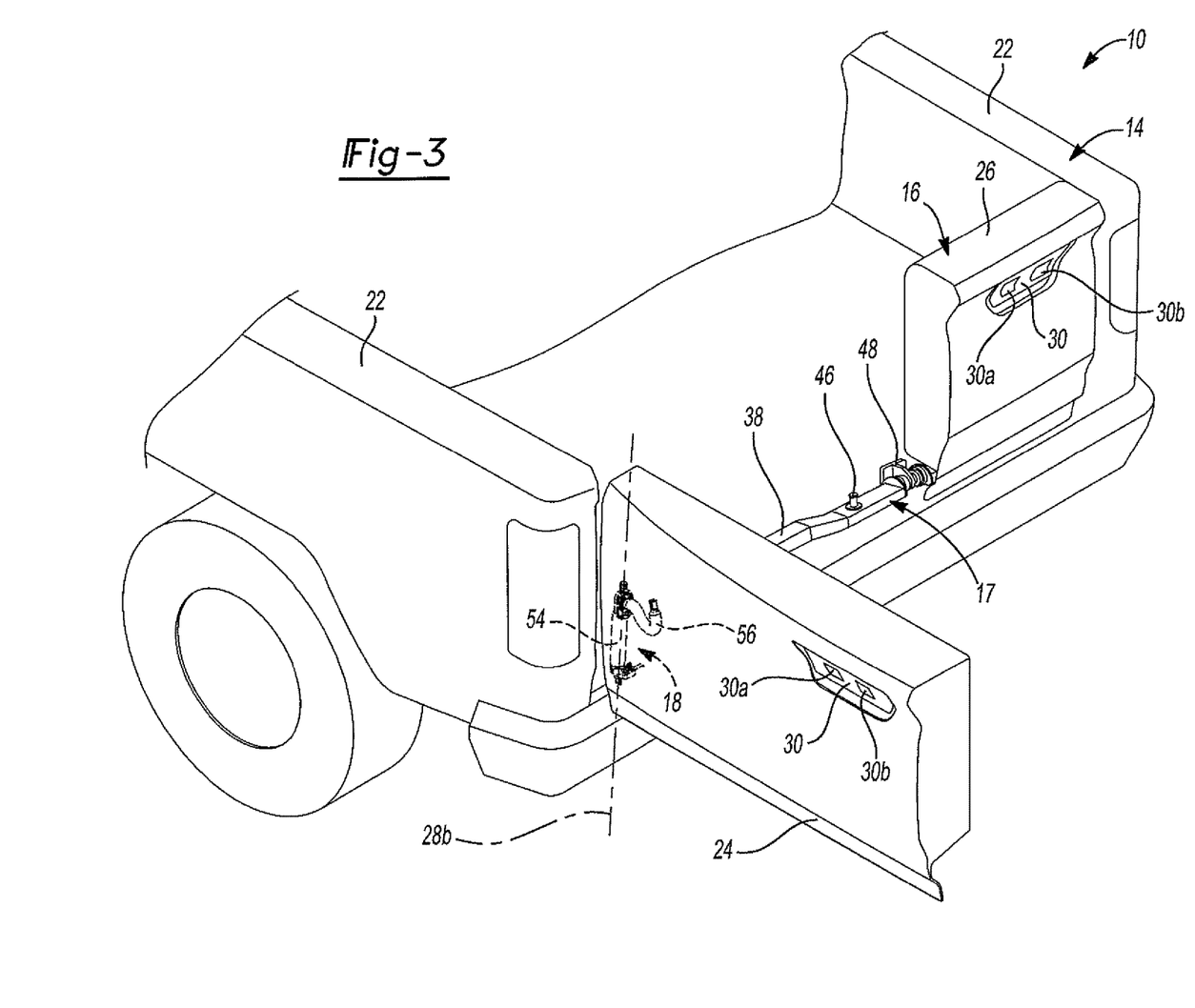
FIG. 3 is a partial perspective view of the cargo bed of FIG. 1 with one door of the multi-functional tailgate in a vertical open position.

With reference to FIGS. 1-3, a vehicle 10 is provided. The vehicle 10 can be similar or the same as the vehicle disclosed in Applicant's commonly owned U.S. Pat. No. 8,740,279, the disclosure of which is incorporated herein by reference. The vehicle 10 includes a cab (not shown), a cargo bed 14, a multi-functional tailgate 16, a frame 17 and a grommet assembly 18. The cargo bed 14 is attached to an aft end of the cab and includes sidewalls 22 extending between fore and aft ends of the cargo bed 14. The multi-functional tailgate 16 spans across the aft end of the cargo bed 14 and is pivotably coupled thereto. The multi-functional tailgate 16 includes left and right doors 24, 26. Each door 24, 26 of the tailgate 16 is independently pivotable between a closed position (FIG. 1) and a horizontal open position (FIG. 2) about a horizontal axis 28a (only door 24 is shown pivoted in the horizontal open position in FIG. 2). Each door 24, 26 is also independently pivotable between the closed position and a vertical open position (FIG. 3) about respective vertical axes 28b (only door 24 is shown pivoted to the vertical open position in FIG. 3). Each door 24, 26 includes a handle 30 attached thereto. Each handle 30 includes a pair of actuators 30a, 30b (e.g., push buttons, touchpads, etc.).

Figure 4:
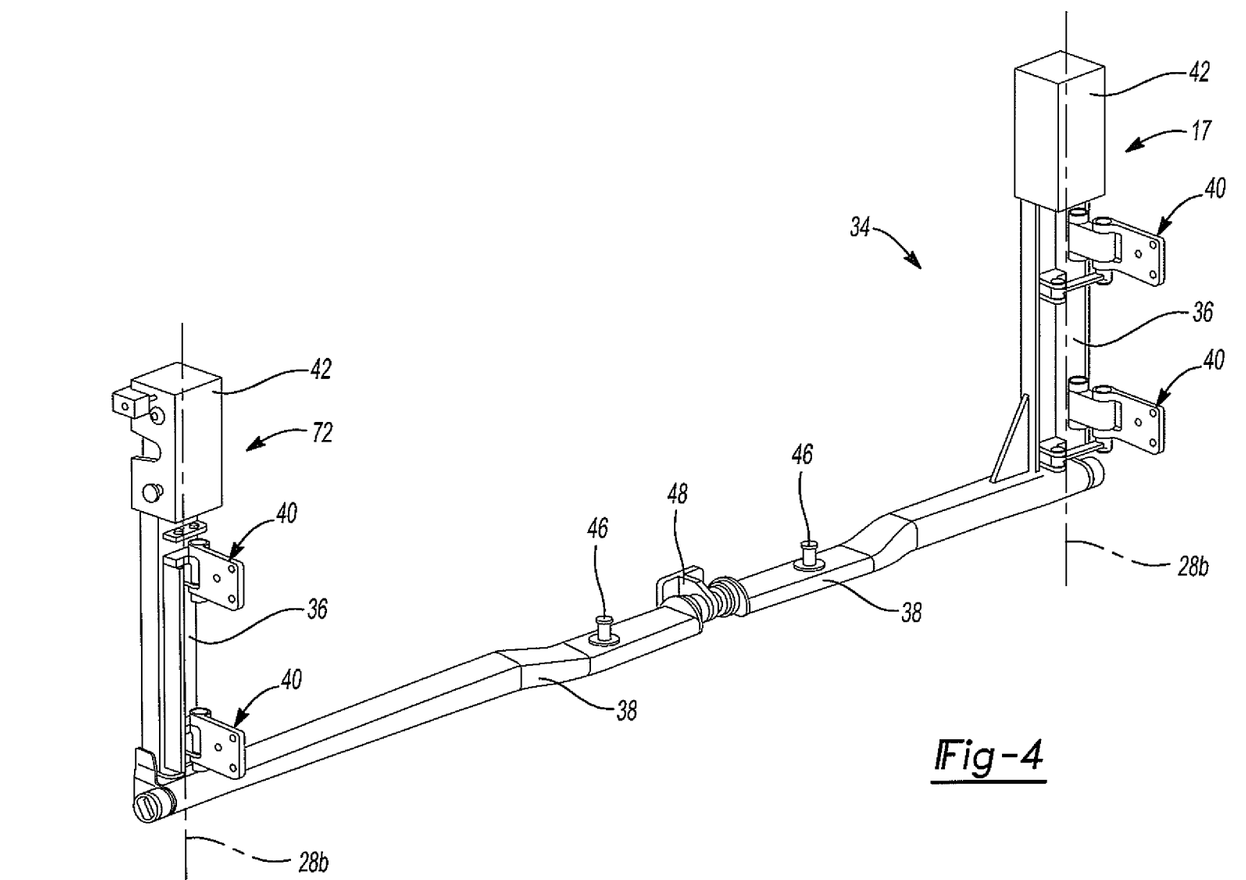
FIG. 4 is a perspective view of a frame of the cargo bed.
Figure 5:
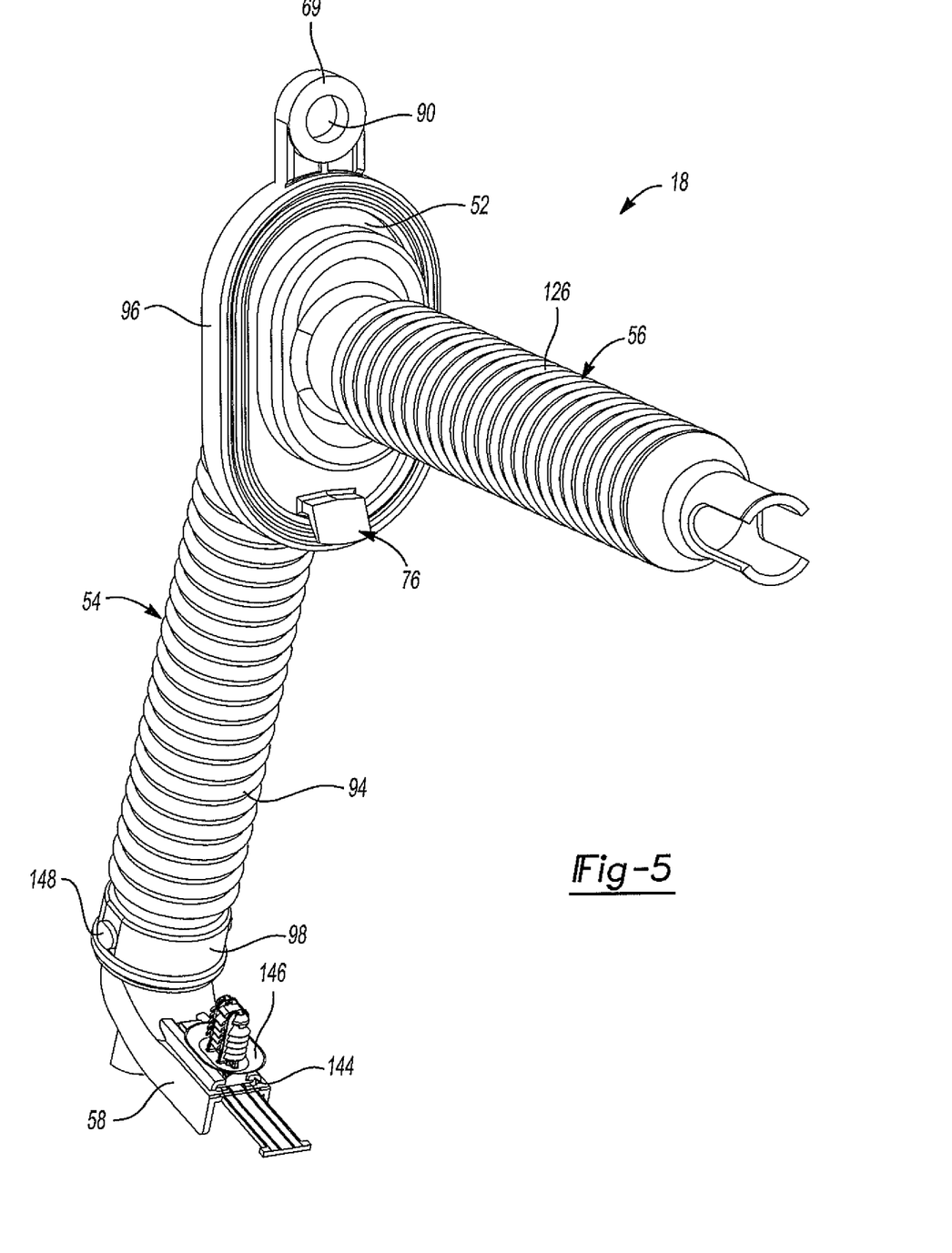
FIG. 5 is a perspective view of the grommet assembly.

As shown in FIG. 4, the frame 17 is U-shaped and includes left and right frame members 32, 34. Each of the left and right frame members 32, 34 are L-shaped and includes a vertical section 36 and a horizontal section 38. The vertical section 36 defines a respective vertical axis 28b. The vertical section 36 includes hinges 40 and a latch 42. The door 24, 26 is pivotably attached to the vertical section 36 via the hinges 40, thereby allowing the door 24, 26 to pivot about the respective vertical axis 28b. The latch 42 is configured to latch onto a striker pin (not shown) extending outwardly from a respective sidewall 22. When the latch 42 is latched onto the striker pin, the door 24, 26 is prevented from pivoting about the horizontal axis 28a. When the latch 42 is unlatched from the striker pin, the door 24, 26 is allowed to pivot about the horizontal axis 28a.

The horizontal section 38 is rotatably coupled to the cargo bed 14 via a connector 48 and defines the horizontal axis 28a. The horizontal section 38 includes a striker pin 46 extending outwardly therefrom. The door 24, 26 includes a latch (not shown) that is configured to latch onto the striker pin 46. When the latch is latched onto the striker pin 46, the door 24, 26 is prevented from pivoting about the respective vertical axis 28b. When the latch is unlatched from the striker pin 46, the door 24, 26 is allowed to pivot about the respective vertical axis 28b.

The actuator 30a is operatively connected to the latch of respective doors 24, 26 and controls the latch latching to and unlatching from respective striker pins 46. The actuator 30a is also operatively connected with a latch assembly (not shown) associated with the doors 24, 26 and controls latching and unlatching of the doors 24, 26 to and from each other. The actuator 30b is operatively connected to the latch 42 and controls the latch 42 latching to and unlatching from the striker pin extending from respective sidewalls 22.

Figure 6:
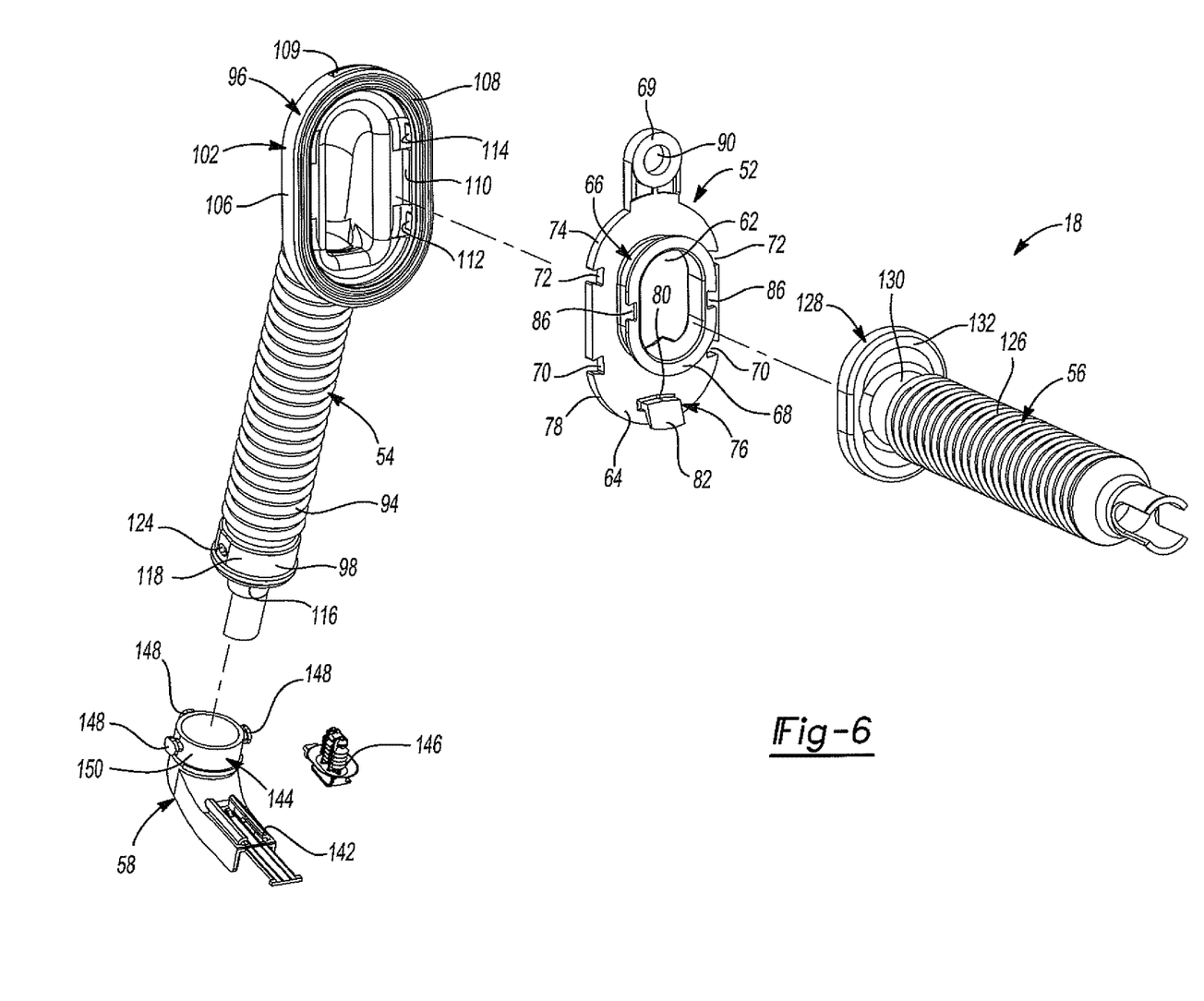
FIG. 6 is an exploded view of the grommet assembly.
Figure 7:
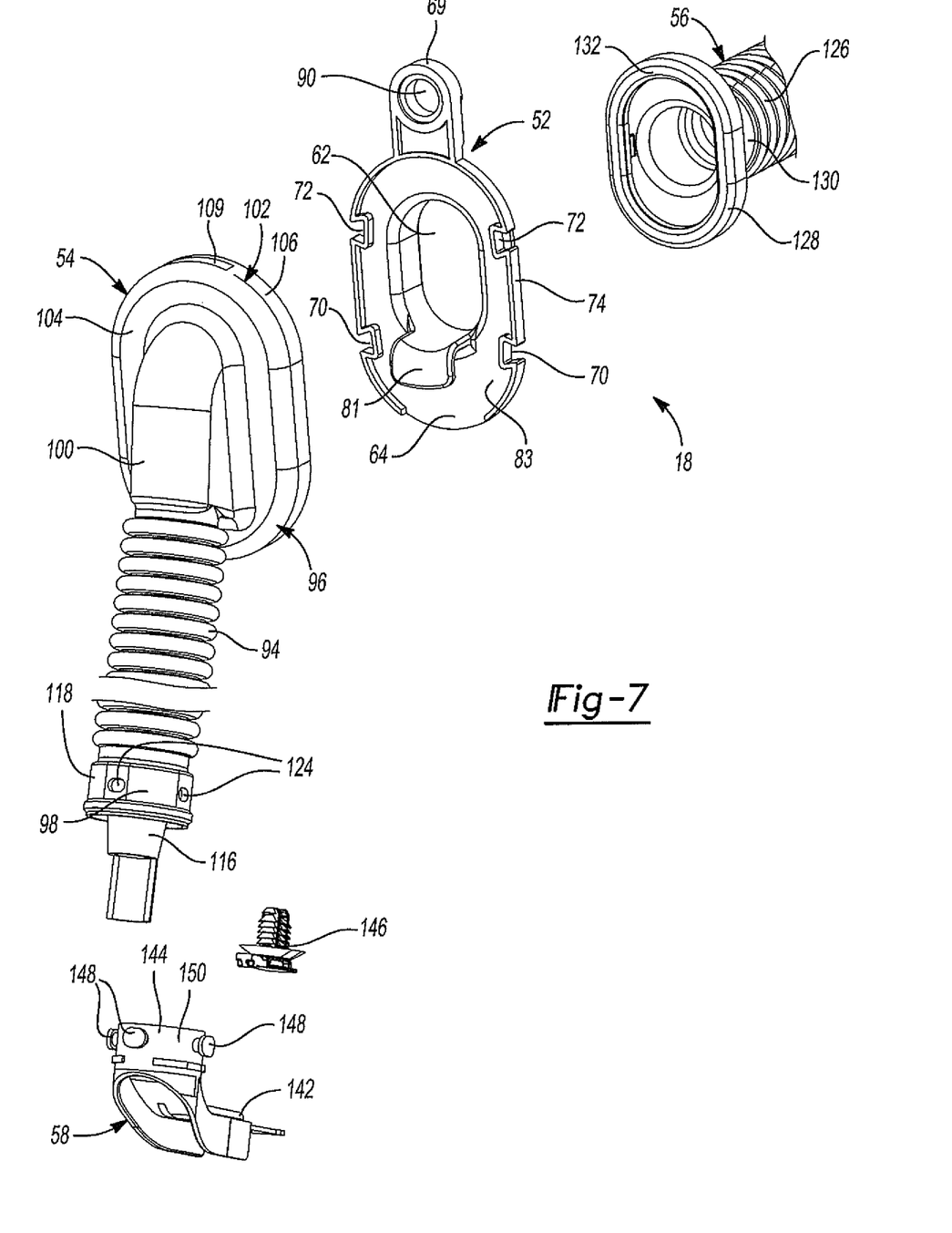
FIG. 7 is another exploded view of the grommet assembly.

As shown in FIGS. 5-9, the grommet assembly 18 includes a retainer 52, a flexible vehicle-body grommet 54, a flexible door grommet 56 and an elbow 58. The retainer 52 is made of a polymeric or metallic material, for example. The retainer 52 is attached to a lateral side 60 of the door 24 and has an opening 62 extending therethrough. With reference to FIGS. 6 and 7, the retainer 52 includes a plate 64, a tubular-shaped body 66, an annular-shaped flange 68 extending radially outwardly from an end of the body 66, and an coupling member 69. The plate 64 includes first U-shaped slots 70 and second U-shaped slots 72. The slots 70 are formed in an outer diametrical surface 74 of the plate 64 and are diametrically opposed to each other. The slots 72 are also formed in the outer diametrical surface 74 of the plate 64 and are diametrically opposed to each other. A locking member 76 extends from a side 78 of the plate 64 and includes a horizontal portion 80 and a vertical portion 82. The horizontal portion 80 extends from the side 78 of the plate 64 and the vertical portion 82 extends from an end of the horizontal portion 80. An L-shaped retaining member 81 extends from another side 83 of the plate 64 that is opposite the side 78.

The body 66 extends from the side 78 of the plate 64 and into a cavity 85 of the door 24. The flange 68 that extends radially outwardly from the end of the body 66 includes U-shaped slots 86 formed in an outer diametrical surface thereof. The slots 86 are diametrically opposed to each other. The coupling member 69 extends from the plate 64 and includes an opening 90 formed therein. A fastener 91 extends through the opening 90 of the coupling member 69 and through an opening 92 in the lateral side 60 of the door 24, thereby securing the retainer 52 to the door 24.

Figure 9:
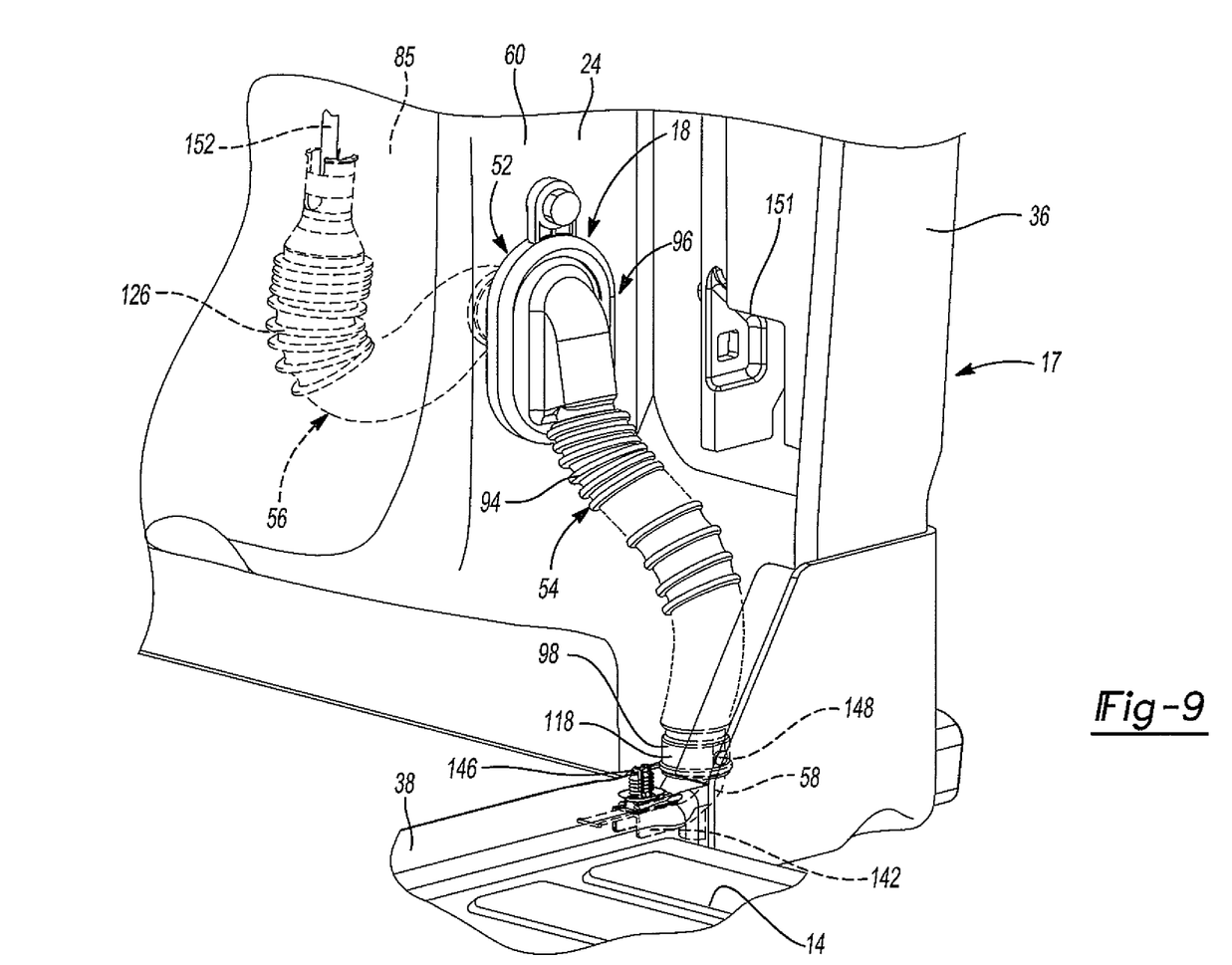
FIG. 9 is a partial perspective view of the one door of the multi-functional tailgate in the vertical opening position.

The flexible vehicle-body grommet 54 is coupled to the plate 64 of the retainer 52 and the elbow 58. The flexible vehicle-body grommet 54 is pivotable about the horizontal axis 28a when the door 24 is pivoted to the horizontal open position (FIG. 2). The flexible vehicle-body grommet 54 is also stretched when the door 24 is pivoted to the vertical open position (FIG. 9). The flexible vehicle-body grommet 54 is made of a resiliently compressible material and includes a bellows portion 94, a connector portion 96 and an attachment portion 98. The connector portion 96 extends from an end of the bellows portion 94 and is coupled to the plate 64 of the retainer 52. The connector portion 96 includes a body 100 and a flange 102.

The flange 102 extends around the body 100 and includes an inner member 104, an intermediate member 106 and an outer member 108. The inner member 104 extends outwardly from the body 100. The intermediate member 106 extends perpendicularly from an end of the inner member 104 and has a rectangular-shaped opening 109 that extends radially through inner and outer diametrical surfaces of the intermediate member 106. The outer member 108 extends perpendicularly from an end of the intermediate member 106. The outer member 108 also extends parallel to the inner member 104. The inner member 104, the intermediate member 106 and the outer member 108 cooperate to define a slot 110.

First attachments 112 are disposed in the slot 110 and are integral with the inner, intermediate and outer members 104, 106, 108 (only one shown in FIG. 6). The attachments 112 are also diametrically opposed to each other. Second attachments 114 are disposed in the slot 110 and are integral with the inner, intermediate and outer members 104, 106, 108 (only one shown in FIG. 6). The attachments 114 are also diametrically opposed to each other.

The flange 102 is disposed over a periphery of the plate 64 such that the attachments 112 are disposed in respective slots 70 formed in the plate 64 and the attachments 114 are disposed in respective slots 72 formed in the plate 64. In this way, the flexible vehicle-body grommet 54 is secured to the retainer 52. When the flange 102 is disposed over the periphery of the plate 64 and the retainer 52 is attached to the door 24, the locking member 76 cooperates with the door 24 to further prevent movement of the retainer 52 and the retaining member 81 cooperates with the vehicle-body grommet 54 to further secure the retainer 52 and the vehicle-body grommet 54 to each other. The coupling member 69 extends through the opening 109 of the intermediate member 106, thereby further securing the flexible vehicle-body grommet 54 and the retainer 52 to each other.

Figure 8:
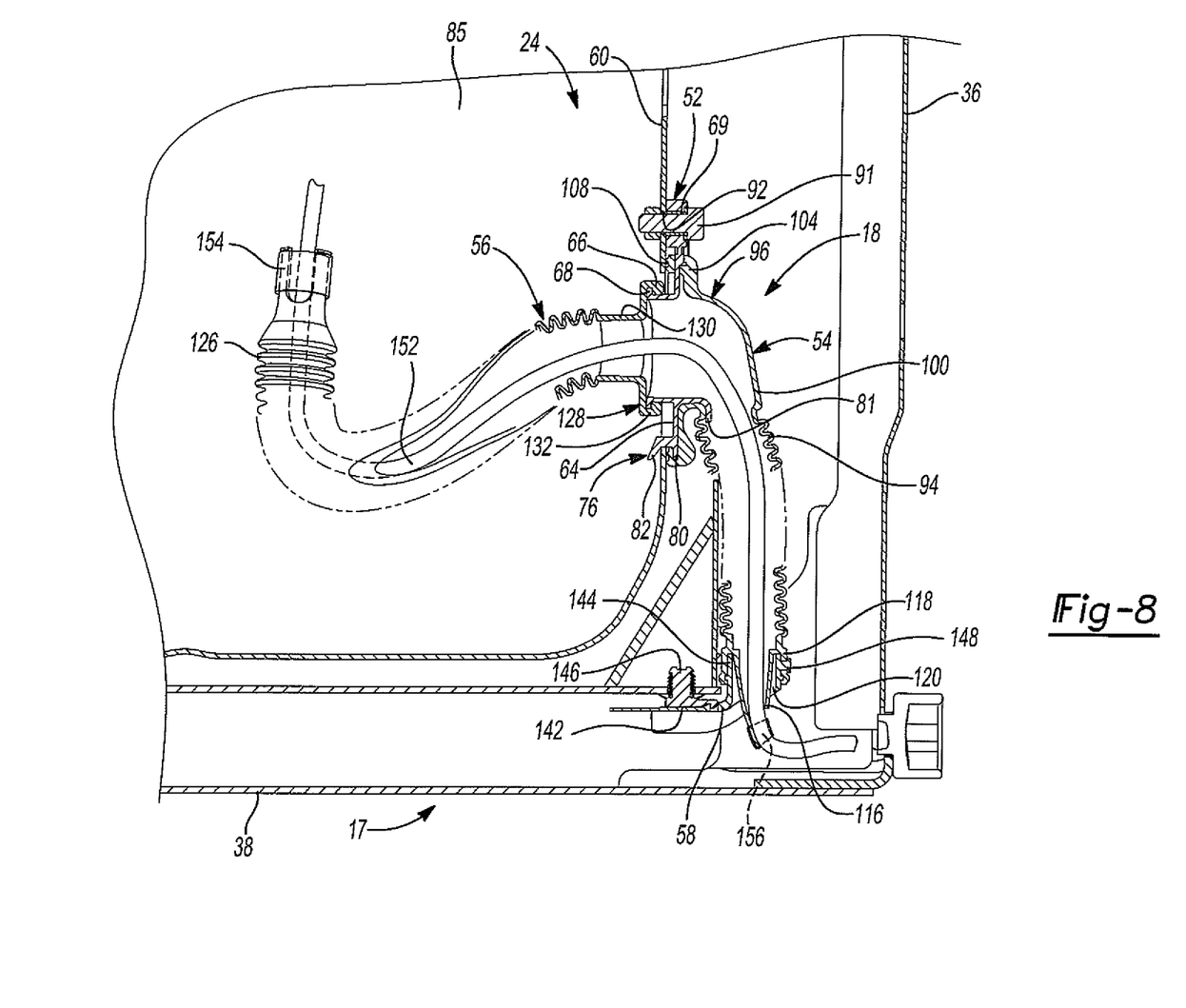
FIG. 8 partial cross-sectional view of the one door of the multi-functional tailgate in a closed position with the grommet assembly disposed therein.

The attachment portion 98 extends from the other end of the bellows portion 94 and is attached to the elbow 58. The attachment portion 98 includes an inner hub 116 and an outer hub 118. The inner hub 116 and the outer hub 118 cooperate to define a space 120 therebetween (FIG. 8). The outer hub 118 includes a plurality of openings 124 formed therein.

The flexible door grommet 56 is disposed within the cavity 85 of the door 24 and is coupled to the flange 68 of the retainer 52. The flexible door grommet 56 is pivotable about the horizontal axis 28a when the door 24 is pivoted to the horizontal open position. The flexible door grommet 56 is also partially compressed when the door 24 is pivoted to the vertical open position (FIG. 9). The flexible door grommet 56 is made of a resiliently compressible material and includes a bellows portion 126 and a connector portion 128. The connector portion 128 extends from an end of the bellows portion 126 and is coupled to the flange 68 of the retainer 52. The connector portion 96 includes a cylindrically-shaped body 130 and a flange 132.

The flange 132 extends 360 degrees around the body 130 and is disposed over a periphery of the flange 68 such that the flexible door grommet 56 is secured to the retainer 52. The elbow 58 is attached to the horizontal section 38 of the left frame member 32 and the other end of the vehicle-body grommet 54. The elbow 58 is made of a polymeric or metallic material, for example, and includes a coupling portion 142 and a housing portion 144. A projection 146 snaps into engagement with the coupling portion 142 and is attached to the horizontal section 38 of the left frame member 32. In some configurations, the projection 146 is integral with the coupling portion 142.

The housing portion 144 is cylindrically-shaped and includes protrusions 148 extending from an outer diametrical surface 150 thereof. The housing portion 144 is disposed within the space 120 of the attachment portion 98 and the protrusions 148 extend through respective openings 124. In this way, the elbow 58 and the vehicle-body grommet 54 are attached to each other.

With continued reference to FIGS. 1-9, operation of the grommet assembly 18 will be described in detail. When the door 24 is pivoted from the closed position to the horizontal open position, the flexible vehicle-body grommet 54 and the flexible door grommet 56 pivot about the horizontal axis 28a. It should be understood that the flexible vehicle-body grommet 54 and the flexible door grommet 56 are not stretched or compressed when the door 24 is pivoted from the closed position to the horizontal open position. The grommet assembly 18 is at least partially positioned in a cut-out 151 (FIG. 9) formed in the vertical section 36 of the frame 17 when the door 24 is in the closed position.

A wiring harness 152 extends through the grommet assembly 18 (i.e., the wiring harness 152 extends through the housing portion 144 of the elbow 58, the flexible vehicle-body grommet 54, the retainer 52 and the flexible door grommet 56) and is operatively connected to the actuators 30a, 30b of the door 24 and to other components (e.g., control modules (not shown), latch 42, etc.) of the vehicle 10. The wiring harness 152 is attached to an end of the flexible door grommet 56 via an adhesive 154 (e.g., tape) and to the attachment portion 98 of the flexible vehicle-body grommet 54 via an adhesive 156 (e.g., tape).

When the door 24 is pivoted from the closed position to the vertical open position, the flexible vehicle-body grommet 54 stretches (i.e., the bellows portion 94 of the flexible vehicle-body grommet 54 stretches). The wiring harness 152 being attached to the flexible vehicle-body grommet 54 and the flexible door grommet 56 causes the wiring harness 152 to move toward the attachment portion 98 of the flexible vehicle-body grommet 54 when the door 24 is pivoted from the closed position to the vertical open position, which, in turn, causes flexible door grommet 56 to at least partially compress (i.e., the bellows portion 126 of the flexible door grommet 56 at least partially compresses). In this way, the direction that the wiring harness 152 moves when the door 24 is pivoted to the vertical open positon, for example, can be controlled, thereby preventing the wiring harness 152 from moving freely within the cavity 85 and being damaged by components (not shown) disposed within the cavity 85 of the door 24.

One of the benefits of the grommet assembly 18 of the present disclosure is that the grommet assembly 18 is allowed to move in multiple directions. For example, the grommet assembly 18 is allowed to pivot about the horizontal axis 28a when the door 24 is pivoted to the horizontal open position and about the respective vertical axis 28b when the door is pivoted to the vertical open position. Another benefit of the grommet assembly 18 of the present disclosure is that the grommet assembly 18 is allowed to stretch and compress to protect the wiring harness 152 when the door 24 is pivoted to the vertical open position, for example.

What is claimed is:

1. A vehicle comprising: a vehicle body; a door coupled to the vehicle body and pivotable about a horizontal axis between a closed position and a horizontal open position, the door also pivotable about a vertical axis between the closed position and a vertical open position; and a flexible vehicle-body grommet coupled to the vehicle body and the door, the flexible vehicle-body grommet pivotable about the horizontal axis when the door is pivoted to the horizontal open position and a flexible door grommet attached to and disposed within the door, wherein the vehicle-body grommet stretches and the door grommet at least partially compresses when the door is pivoted to the vertical open position.

2. The vehicle of claim 1, wherein the vehicle-body grommet stretches when the door is pivoted to the vertical open position.

3. The vehicle of claim 1, wherein the vehicle-body grommet is unstretched when the door is pivoted to the horizontal open position.

4. The vehicle of claim 1, further comprising a vehicle frame attached to the vehicle body, and wherein the vehicle-body grommet is coupled the vehicle frame.

5. The vehicle of claim 1, wherein the vehicle-body grommet and the door grommet are made of a resiliently compressible material.

6. The vehicle of claim 1, wherein the vehicle-body grommet extends vertically and the door grommet extends horizontally when the door is in the closed position.

7. The vehicle of claim 1, further comprising a wiring harness extending through the vehicle-body grommet and the door grommet and attached to the vehicle-body grommet and the door grommet, and wherein the wiring harness is guided toward the vehicle-body grommet when the door is pivoted to the vertical open position.

8. The vehicle of claim 7, wherein the door grommet is at least partially compressed and the vehicle-body grommet at least partially stretched when the door is moved to the vertical open position.

9. The vehicle of claim 1, wherein the vehicle-body grommet and the door grommet have a bellows construction.

10. The vehicle of claim 1, further comprising a grommet retainer attached to a lateral side of the door, and wherein the vehicle-body grommet and the door grommet are attached to the grommet retainer.

11. The vehicle of claim 10, wherein the grommet retainer is made of a polymeric material.

12. The vehicle of claim 1, wherein the vehicle-body grommet is made of a resiliently compressible material.

13. The vehicle of claim 1, wherein the vehicle body includes a cargo bed, and wherein the flexible vehicle-body grommet is coupled to the cargo bed.

* * * * *